US012674999B2

(12) United States Patent (10) Patent No.: US 12,674,999 B2
Daiku (45) Date of Patent: Jul. 7, 2026

(54) AERIAL DISPLAY APPARATUS

(71) Applicant: TOPPAN Holdings Inc., Tokyo (JP)

(72) Inventor: Yasuhiro Daiku, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 564 days.

(21) Appl. No.: 18/298,459

(22) Filed: Apr. 11, 2023

(65) Prior Publication Data

US 2023/0258955 A1 Aug. 17, 2023

Related U.S. Application Data

(63) Continuation of application No. PCT/JP2021/036728, filed on Oct. 5, 2021.

(30) Foreign Application Priority Data

Oct. 12, 2020 (JP) ................................. 2020-171615

(51) Int. Cl.
G02B 30/56 (2020.01)
(52) U.S. Cl.
CPC ..................................... G02B 30/56 (2020.01)
(58) Field of Classification Search
CPC ..................... G02B 30/56; G02B 30/60; G06F
2203/04108; G06F 3/0421
See application file for complete search history.

(56) References Cited

U.S. PATENT DOCUMENTS

2018/0217670 A1 8/2018 Cho et al.
2021/0096393 A1 4/2021 Daiku

FOREIGN PATENT DOCUMENTS

| CN | 111460412 A | 7/2020 |
| JP | 2014-240960 | 12/2014 |
| JP | 2017-067933 | 4/2017 |
| JP | 2019074933 A | 5/2019 |
| WO | WO 2016/067397 A1 | 5/2016 |
| WO | WO 2018/216619 A1 | 11/2018 |
| WO | WO 2019/030991 A1 | 2/2019 |
| WO | WO 2019/240137 A1 | 12/2019 |

OTHER PUBLICATIONS

English language translation of WIPO patent application No. 2019030991 published on Feb. 14, 2019. Application retrieved from Espacenet at https://worldwide.espacenet.com/ on Sep. 25, 2025. English language translation obtained by using Google Translate tool on-site. (Year: 2019).*

(Continued)

*Primary Examiner* — Angela M. Medich

(74) *Attorney, Agent, or Firm* — Maier & Maier, PLLC

(57) ABSTRACT

An aerial display apparatus includes: a display module including a light emission surface emitting display light to display an aerial image, and displaying the aerial image on a first plane located above the light emission surface and parallel with the light emission surface; a sensing device emitting laser light to form a detection region on a second plane obliquely crossing the first plane, and detecting an object entering the detection region; and a housing housing the display module and the sensing device.

12 Claims, 17 Drawing Sheets

(56) References Cited

OTHER PUBLICATIONS

Satoshi Maekwa et al., "National Institute of Information and Communications Technology Development of a Floating Touch Display for Interfacing with Floating Images", National Institute of Information and Communications Technology, Apr. 15, 2009.

International Search Report (PCT/ISA/210) issued in International Application No. PCT/JP2021/036728 dated Dec. 7, 2021.

Written Opinion issued (PCT/ISA/237) in International Application No. PCT/JP2021/036728 dated Dec. 7, 2021.

English Translation of IPRP (PCT/IB/338 and PCT/IB/373) (Apr. 27, 2023 and Apr. 13, 2023) and the Written Opinion of ISA (PCT/ISA/237) issued in International Application No. PCT/JP2021/036728 dated Dec. 7, 2021 (6 pages).

Extended Search Report issued on Apr. 16, 2024, in corresponding European Application No. 21879913.8, 8 pages.

\* cited by examiner

60

50

40

30

20

3

10 { 12, 11 }

X
Y
Z

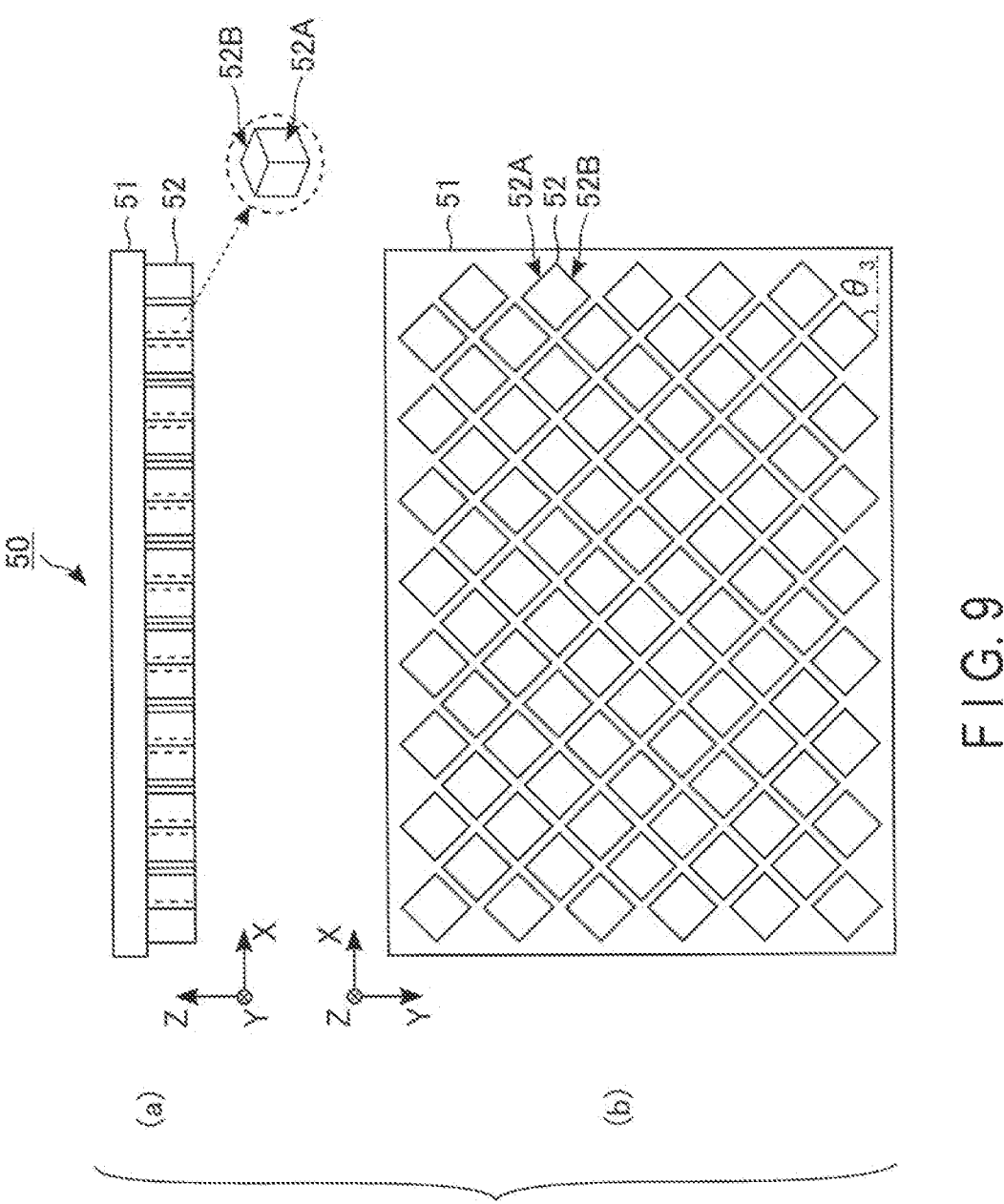
F I G. 9

(a)Plan view (b)Side view

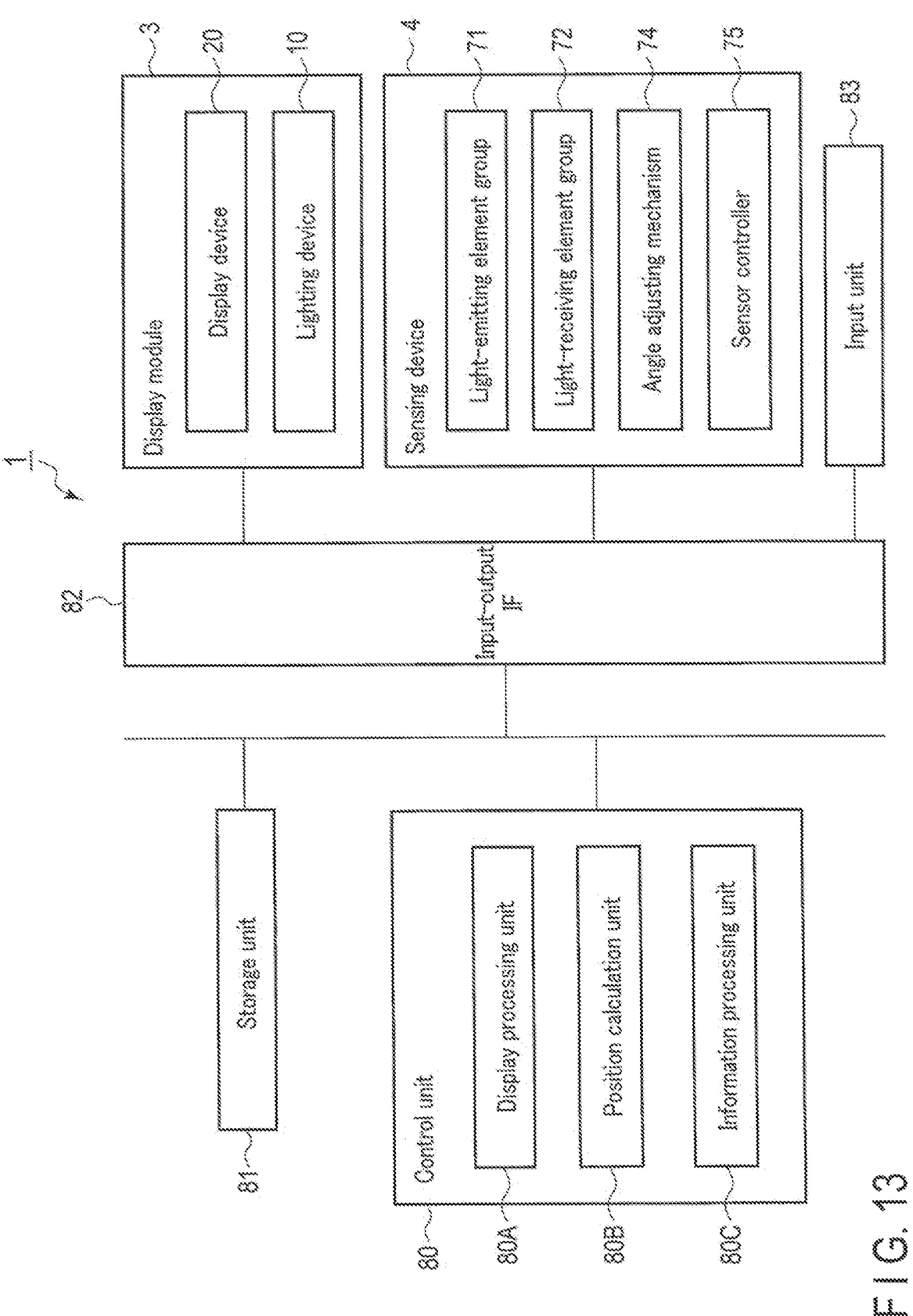
F I G. 13

Light emitted from lighting device

Light emitted from first light control device

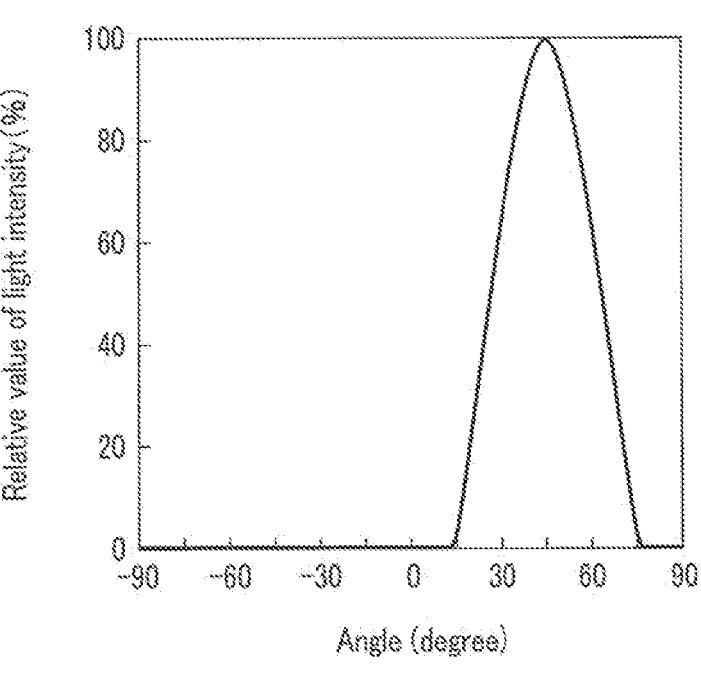
F I G. 16

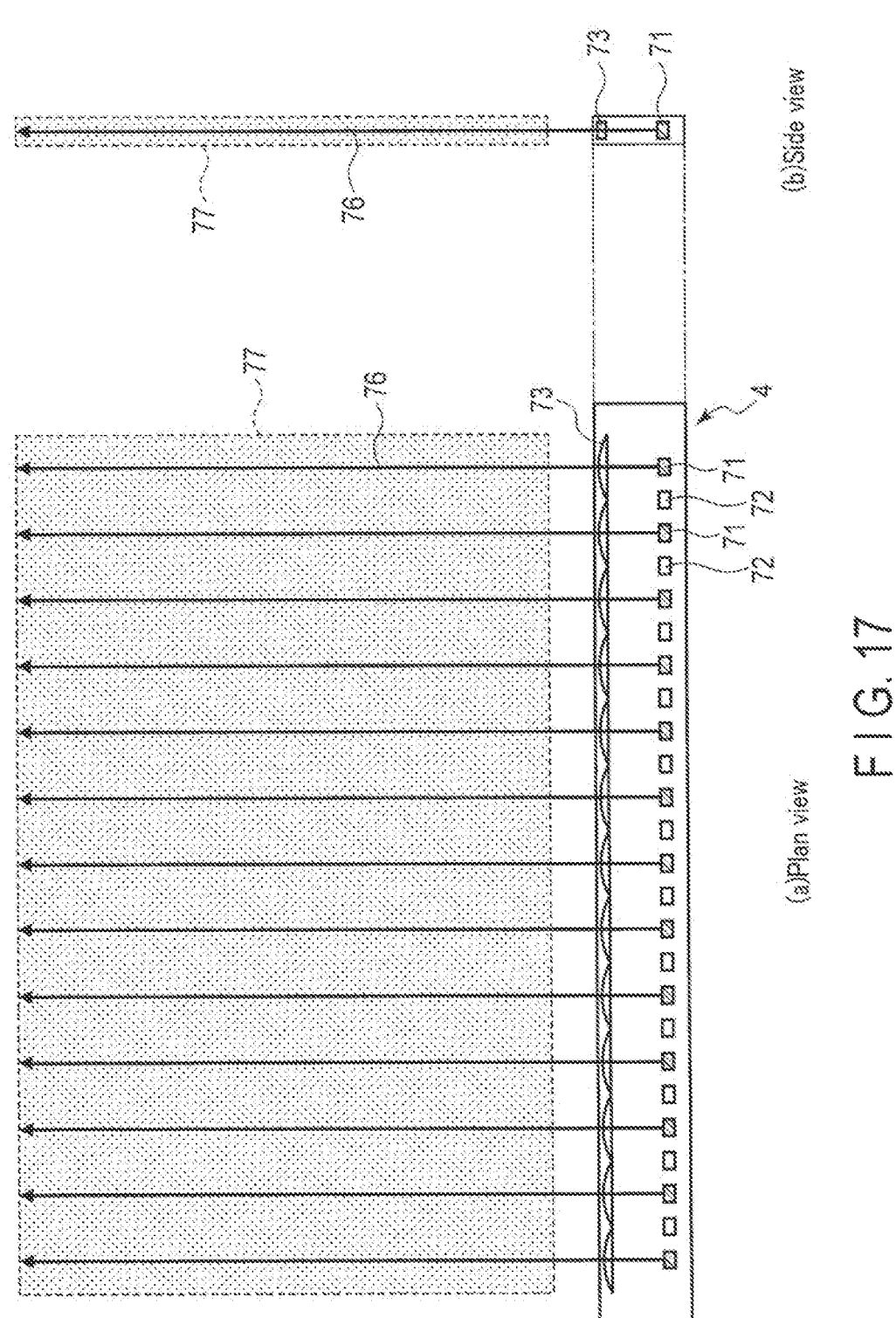
F I G. 17

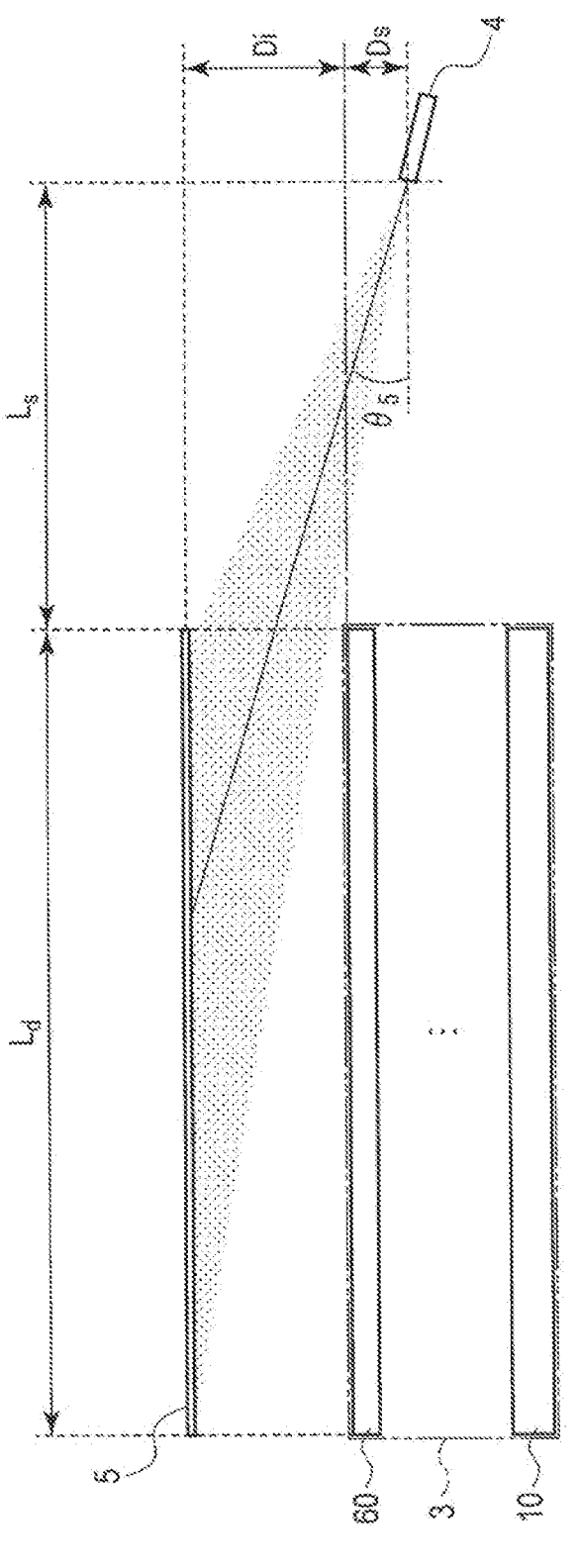
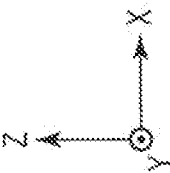
F I G. 20

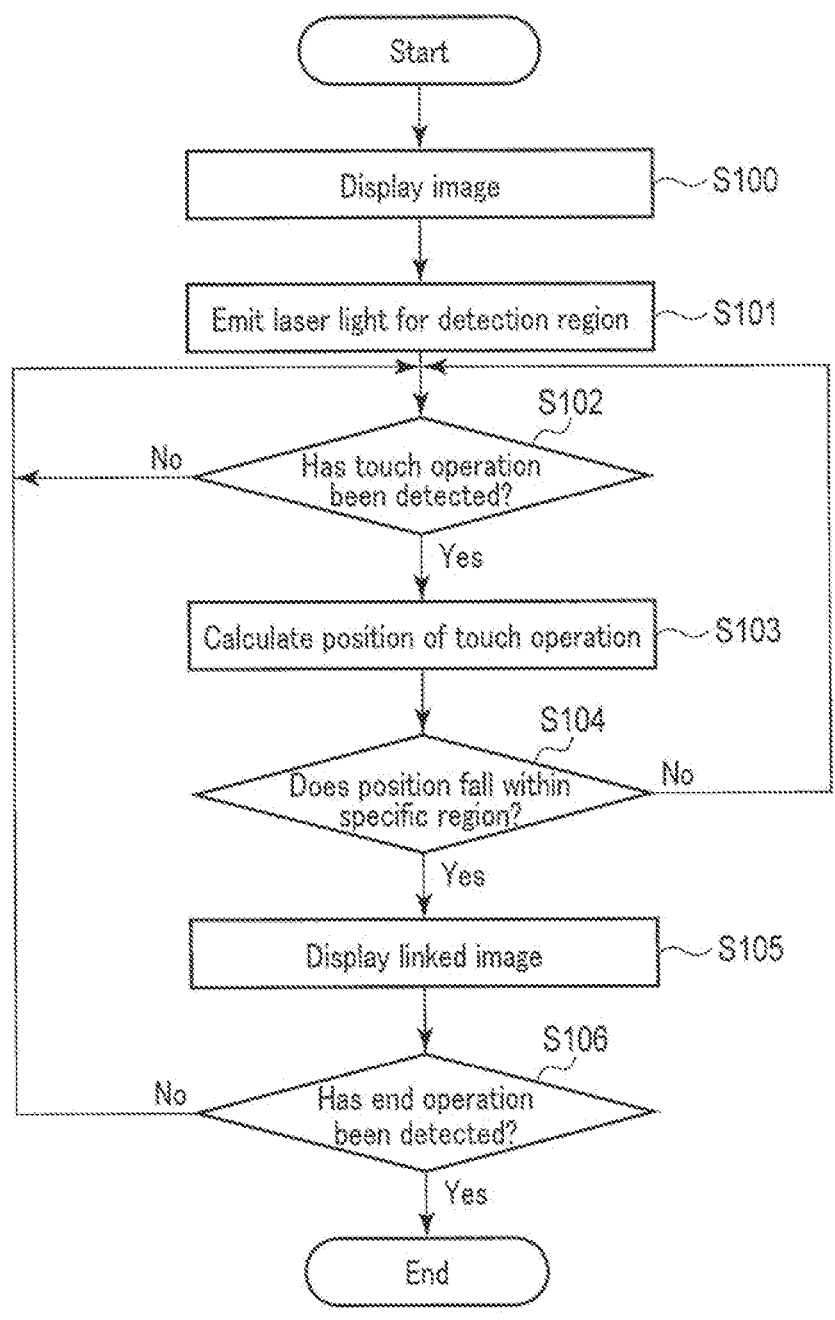
F I G. 21

AERIAL DISPLAY APPARATUS

CROSS-REFERENCE TO RELATED APPLICATIONS

This application is a Continuation Application of PCT Application No. PCT/JP2021/036728, filed Oct. 5, 2021, and based upon and claiming the benefit of priority from Japanese Patent Application No. 2020-171615, filed Oct. 12, 2020, the entire contents of all of which are incorporated herein by reference.

FIELD

The present invention relates generally to an aerial display apparatus.

BACKGROUND

An aerial display apparatus capable of displaying an image and/or a moving image as an aerial image has been studied and is expected to be a new human-machine interface. The aerial display apparatus reflects light emitted from a display surface of a display device and images a real image in an air using, for example, a dihedral corner reflector array in which dihedral corner reflectors are arranged in an array. In the display method using the dihedral corner reflector array, aberration does not occur, and a real image (aerial image) is displayed at a plane-symmetrical position. If the aerial image can be operated in a non-contact manner, input is possible without direct contact required in input with a touch panel, and hygienic input is possible.

For example, a system enabling operation of an aerial image by a fingertip has been proposed. However, to sense the same plane as that of the aerial image, it is required to install a sensor in the vicinity of the aerial image, and there are cases where installing a sensor in a housing is difficult. In addition, to execute sensing along an aerial image, it is required to dispose a frame including a sensor around the aerial image, and this structure may cause increase in size of the housing.

SUMMARY

A first aspect of the present invention provides an aerial display apparatus comprising: a display module including a light emission surface emitting display light to display an aerial image, and displaying the aerial image on a first plane located above the light emission surface and parallel with the light emission surface; a sensing device emitting laser light to form a detection region on a second plane obliquely crossing the first plane, and detecting an object entering the detection region; and a housing housing the display module and the sensing device.

A second aspect of the present invention provides the aerial display apparatus according to the first aspect, wherein the sensing device includes: a plurality of light-emitting elements arranged in a first direction and emitting the laser light; and a plurality of light-receiving elements arranged in the first direction and detecting reflected light reflected by the object.

A third aspect of the present invention provides the aerial display apparatus according to the second aspect, wherein the light-emitting elements and the light-receiving elements are alternately arranged.

A fourth aspect of the present invention provides the aerial display apparatus according to the third aspect, wherein the sensing device includes an angle adjusting mechanism adjusting an angle at which the first plane crosses the detection region by adjusting angles with which the light-emitting elements face.

A fifth aspect of the present invention provides the aerial display apparatus according to the second aspect, wherein the sensing device includes a plurality of lenses provided above the light-emitting elements and the light-receiving elements.

A sixth aspect of the present invention provides the aerial display apparatus according to the fifth aspect, wherein the sensing device includes a case housing the light-emitting elements, the light-receiving elements, and the lenses.

A seventh aspect of the present invention provides the aerial display apparatus according to the first aspect, wherein the display module includes: a display device emitting display light obliquely with respect to the light emission surface and displaying an image; a mirror device reflecting the display light emitted from the display device to a side opposite to the display device; and an optical path deflection device refracting the display light reflected with the mirror device in a direction perpendicular to the light emission surface, and the display device, the mirror device, and the optical path deflection device are arranged mutually in parallel.

An eighth aspect of the present invention provides the aerial display apparatus according to the seventh aspect, wherein the optical path deflection device includes a plurality of prisms.

A ninth aspect of the present invention provides the aerial display apparatus according to the seventh aspect, wherein the mirror device includes a plurality of optical elements, and each of the optical elements is formed of a rectangular parallelepiped or a cube, and includes a first and a second reflection surfaces contacting with each other and reflecting light.

A tenth aspect of the present invention provides the aerial display apparatus according to the seventh aspect, further comprising: a lighting device emitting light toward the display device, wherein the display device is a liquid crystal display device.

An eleventh aspect of the present invention provides the aerial display apparatus according to the seventh aspect, further comprising: a first light control device disposed between the display device and the mirror device, wherein the first light control device includes a plurality of first transparent members and a plurality of first light shielding members, the first transparent members and the first light shielding members are alternately arranged such that adjacent ones contact with each other, and each of the first transparent members and the first light shielding members extends in the direction perpendicular to the light emission surface.

A twelfth aspect of the present invention provides the aerial display apparatus according to the seventh aspect, further comprising: a second light control device disposed between the display device and the mirror device, wherein the second light control device includes a plurality of second transparent members and a plurality of second light shielding members, the second transparent members and the second light shielding members are alternately arranged such that adjacent ones contact with each other, and each of the second transparent members and the second light shielding members extends in an oblique direction with respect to the direction perpendicular to the light emission surface.

BRIEF DESCRIPTION OF THE DRAWINGS

FIG. 9 is a side view and a bottom view of a mirror device.

FIG. 13 is a block diagram of an aerial display apparatus.

FIG. 16 is a graph illustrating relation between intensity and an angle in display light emitted from the second light control device.

FIG. 17 is a diagram illustrating a detection region of the sensing device.

FIG. 20 is a schematic diagram illustrating an installation position of the sensing device.

FIG. 21 is a flowchart illustrating operations of the whole aerial display apparatus.

DETAILED DESCRIPTION

Figure 1:
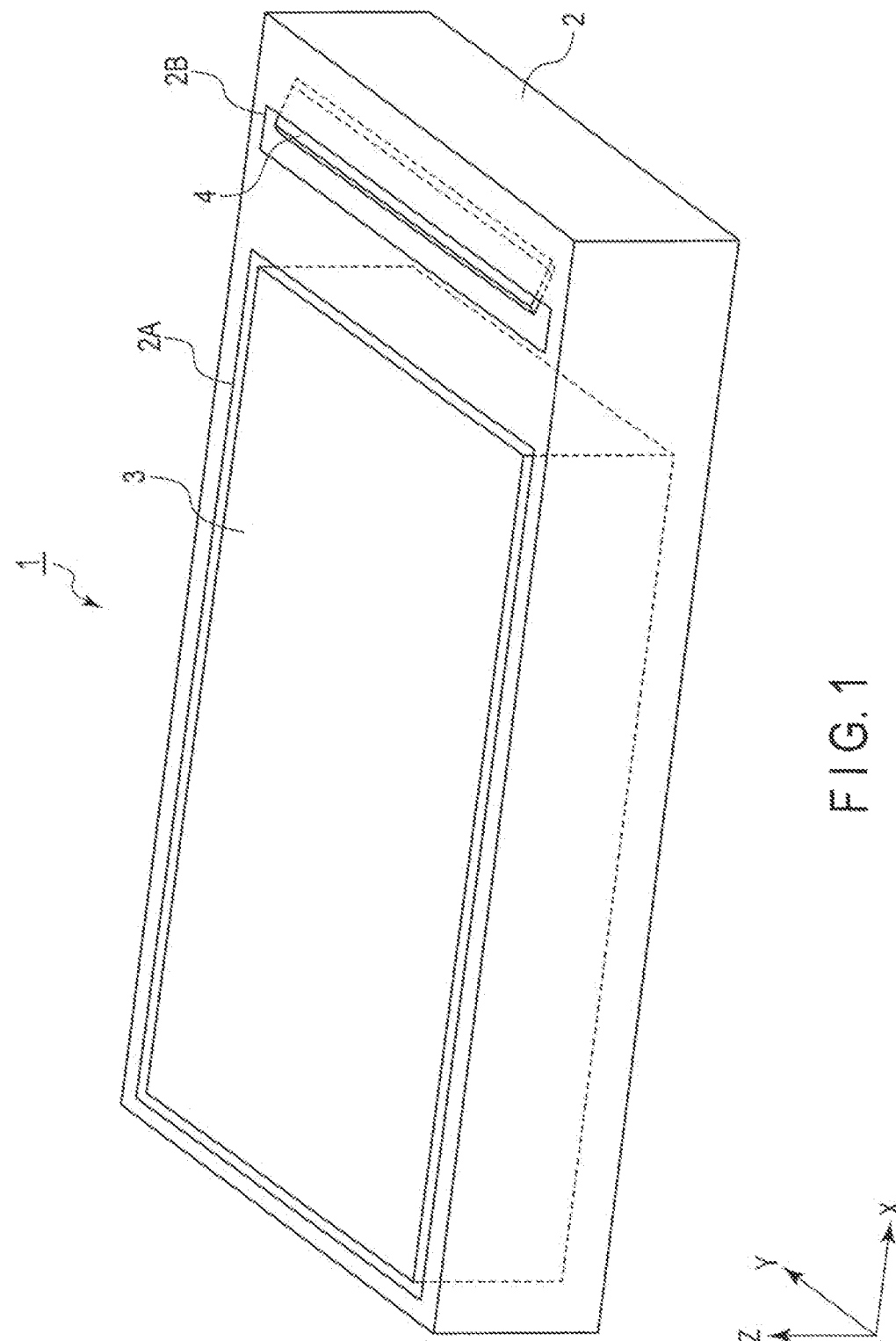
FIG. 1 is a perspective view of an aerial display apparatus according to an embodiment.

An embodiment will be explained hereinafter with reference to drawings. The drawings are schematic or conceptual, and dimensions and the ratio and the like of each of the drawings are not always the same as those of the actual ones. Also, in the case of illustrating the same part between the drawings, the relation and/or ratio between the sizes of them may be illustrated differently. In particular, some of embodiments described herein illustrate apparatuses and methods to embody the technical idea of the present invention, and the technical idea of the present invention is not identified by shapes, structures, and/or arrangement of constituent elements. In the following explanation, elements having the same function and structure are denoted by the same reference numeral, and an overlapping explanation thereof will be omitted.

<1> Configuration of Aerial Display Apparatus 1

FIG. 1 is a perspective view of an aerial display apparatus 1 according to an embodiment. An X direction in FIG. 1 is a direction extending along a side of the aerial display apparatus 1, a Y direction is a direction orthogonal to the X direction in a horizontal plane, and a Z direction is a direction (also referred to as "normal direction") orthogonal to the XY plane. The aerial display apparatus 1 includes a housing 2, a display module 3, and a sensing device 4.

The housing 2 houses the display module 3 and the sensing device 4. An outer shape of the housing 2 is a rectangular parallelepiped. The housing 2 includes an opening 2A exposing a top surface (light emission surface) of the display module 3, and an opening 2B through which light emitted from the sensing device 4 passes. The housing 2 is formed of metal or resin.

The display module 3 is a device displaying an image. The display module 3 displays an aerial image in an aerial space above its light emission surface. The aerial image is a real image formed in an aerial space. The display module 3 includes a plurality of devices arranged at intervals in the Z direction. FIG. 1 illustrates the display module 3 in a simplified form of a rectangular parallelepiped. Details of the display module 3 will be described later.

The sensing device 4 is a device to detect a detection object included in a predetermined region. The sensing device 4 emits laser light in a predetermined direction. The sensing device 4 also detects the laser light reflected by the detection object. Details of the sensing device 4 will be described later.

Figure 2:
FIG. 2 is a perspective view of a display module illustrated in FIG. 1.
Figure 3:
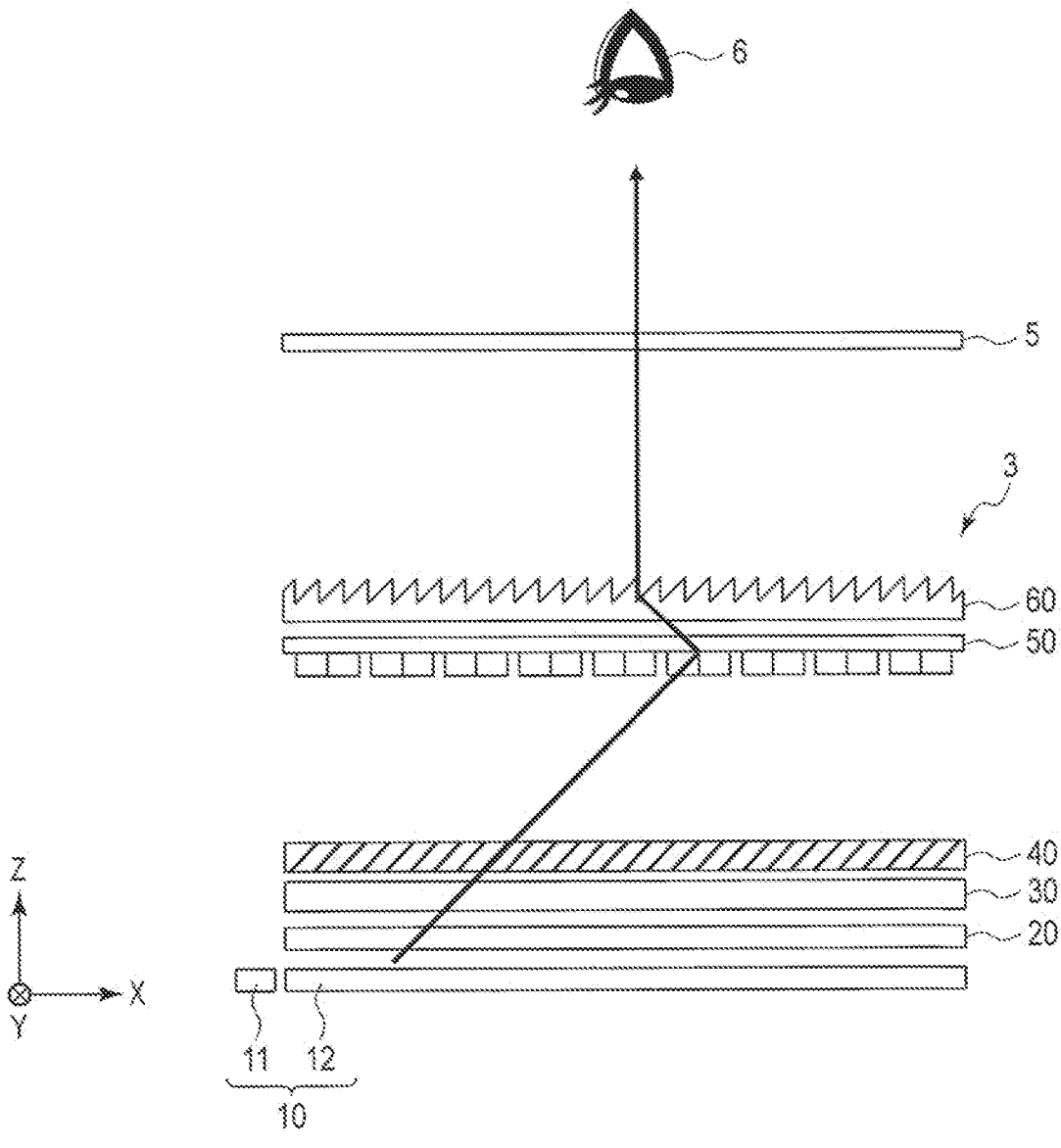
FIG. 3 is a side view of the display module illustrated in FIG. 1.

FIG. 2 is a perspective view of the display module 3 illustrated in FIG. 1. FIG. 3 is a side view of the display module 3 illustrated in FIG. 1. The display module 3 includes a lighting device (also referred to as "backlight") 10, a display device 20, a first light control device 30, a second light control device 40, a mirror device 50, and an optical path deflection device 60. The lighting device 10, the display device 20, the first light control device 30, the second light control device 40, the mirror device 50, and the optical path deflection device 60 are fixed in positions in FIG. 2 with a support member (not illustrated) provided in the housing 2.

The lighting device 10 produces illumination light and emits the illumination light toward the display device 20.

The display device 20 is a transmissive display device. The display device 20 is formed of, for example, a liquid crystal display device. A driving mode of the display device 20 is not particularly limited, and a twisted nematic (TN) mode, a vertical alignment (VA) mode, a homogeneous mode, or the like can be used. The display device 20 receives illumination light emitted from the lighting device 10. The display device 20 allows illumination light to be transmitted therethrough, and performs light modulation. The display device 20 displays a desired image and/or a moving image on its display surface.

The first light control device 30 has a function of reducing a ghost. A ghost is an image generated in an unintended position, and a double image appearing in the vicinity of an aerial image. The first light control device 30 is configured to shield light components other than a predetermined angle range with the normal direction serving as the center. The first light control device 30 may be omitted.

The second light control device 40 has a function of reducing unnecessary light. The unnecessary light is a light component that does not contribute to generation of an aerial image, and a light component linearly transmitted through the mirror device 50. The second light control device 40 is configured to shield light components other than a predetermined angle range with an oblique direction with respect to the normal direction serving as the center. The second light control device 40 may be omitted.

The mirror device 50 reflects light made incident thereon from its bottom surface side to the upper surface side. The mirror device 50 also reflects the incident light in a plane-symmetrical manner. The mirror device 50 forms an aerial image.

The optical path deflection device 60 refracts display light made incident thereon obliquely from its bottom surface in the normal direction. A viewer 6 positioned in front of the optical path deflection device 60 can visually recognize an aerial image 5.

The following is an explanation of details of a plurality of devices forming the display module 3.

<1-1> Structure of Lighting Device 10

Figure 4:
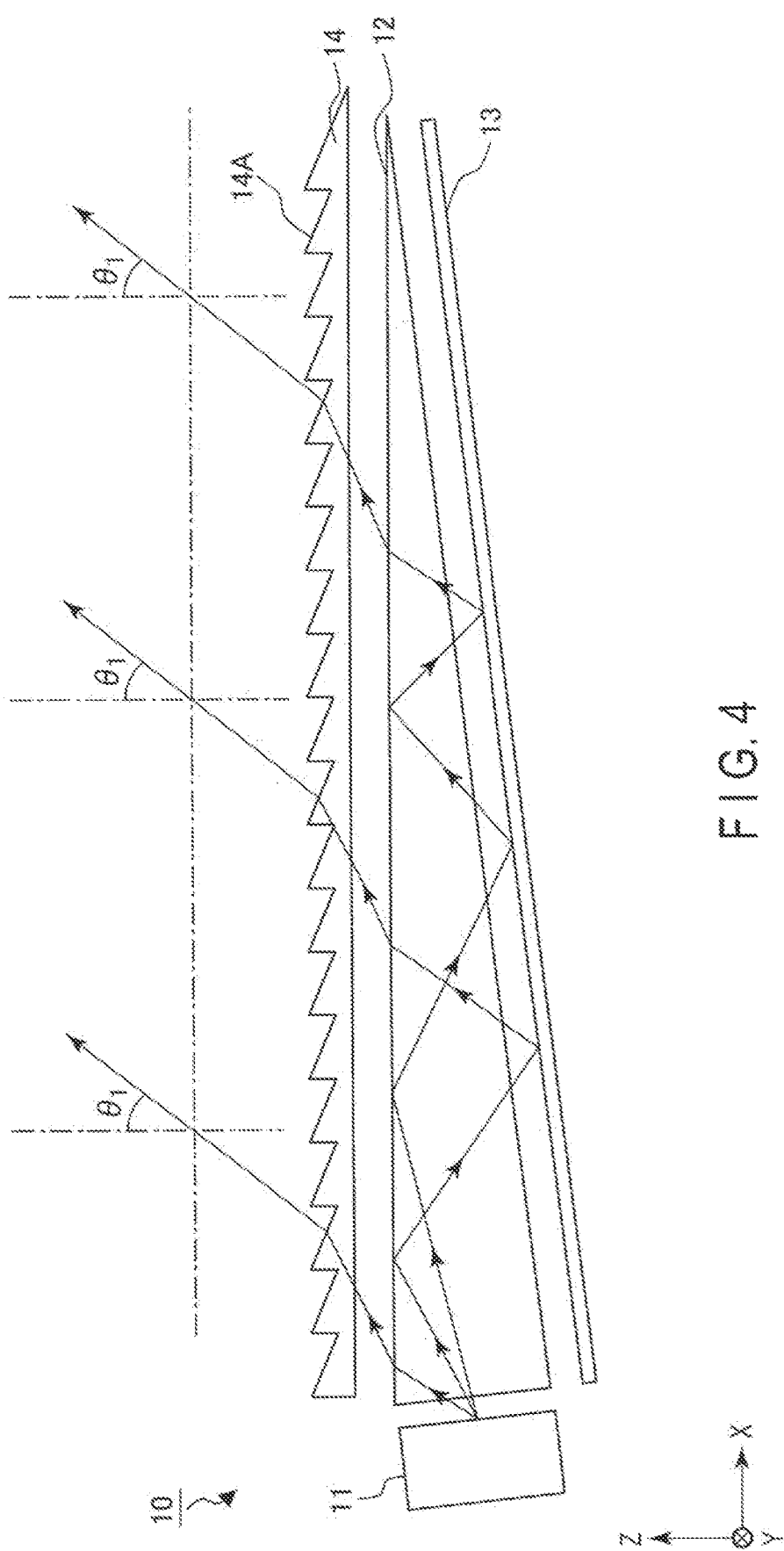
FIG. 4 is a side view of a lighting device.

FIG. 4 is a side view of the lighting device 10. The lighting device 10 includes a light-emitting element 11, a light-guide plate 12, a reflection sheet 13, and a prism sheet 14.

The light-emitting element 11 emits illumination light. The light-emitting element 11 is disposed to face a side surface of the light-guide plate 12, and emits illumination light toward the side surface of the light-guide plate 12. FIG. 4 illustrates one light-emitting element as a rectangle, but, for example, the light-emitting element 11 is formed of a plurality of light-emitting elements arranged in the Y direction.

The light-guide plate 12 guides illumination light from the light-emitting element 11, and emits the illumination light from a top surface thereof. The light-guide plate 12 emits the illumination light in an oblique direction with respect to the Z direction. The light-guide plate 12 has a wedge shape with a thickness decreasing as it extends in the X direction.

The reflection sheet 13 reflects the illumination light emitted from a bottom surface of the light-guide plate 12 toward the light-guide plate 12 again.

The prism sheet 14 refracts the illumination light from the light-guide plate 12. The prism sheet 14 has a structure in which a plurality of triangular poles are laid down and arranged in the X direction. Specifically, a top surface of the prism sheet 14 has a wavy shape (serrated shape) as viewed from side. The prism sheet 14 includes a plurality of refraction surfaces 14A inclined to the left with respect to the Z direction.

The lighting device 10 configured as described above can emit illumination light at a light emission angle $\theta_1$. In addition, the light emission angle $\theta_2$ can be set optimally by adjusting an inclination angle of the refraction surfaces 14A of the prism sheet 14 and a light emission angle of the light-guide plate 12.

<1-2> Structure of First Light Control Device 30

Figure 5:
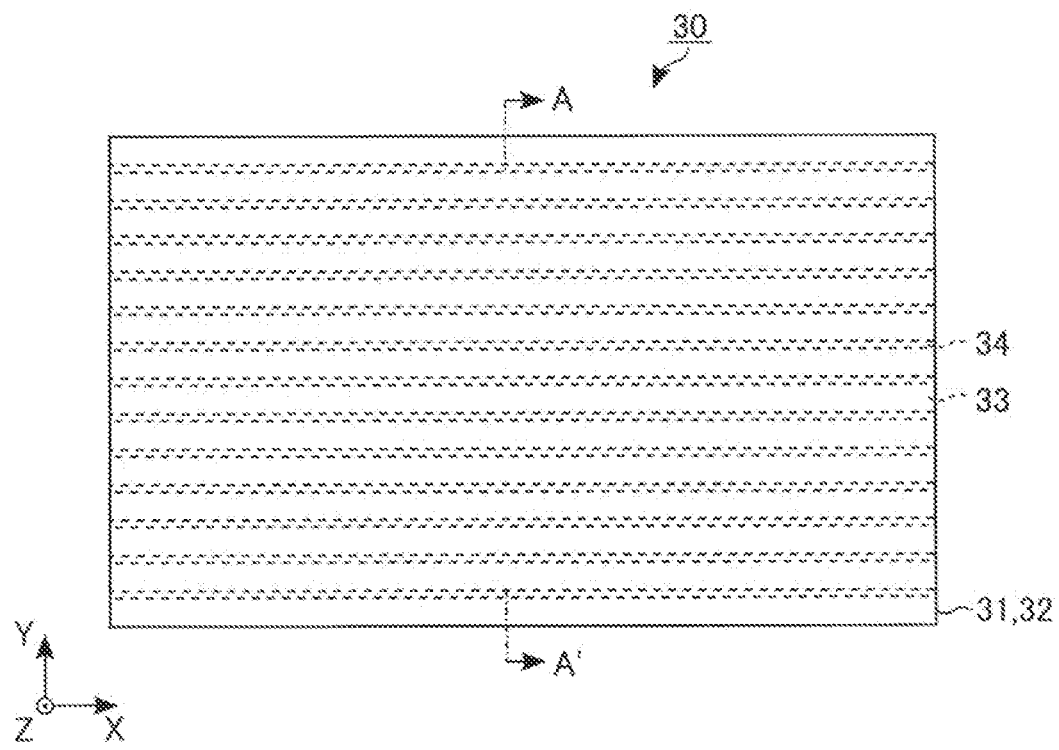
FIG. 5 is a plan view of a first light control device.
Figure 6:
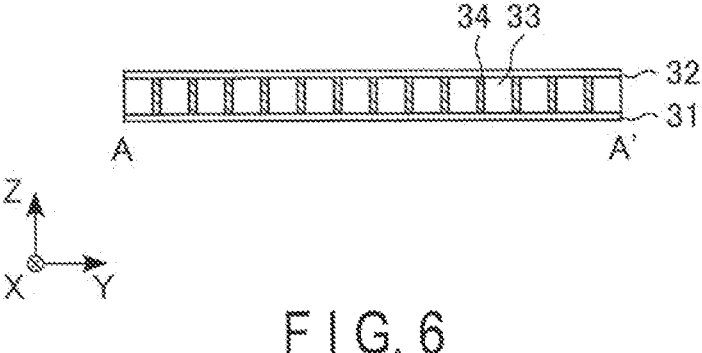
FIG. 6 is a cross-sectional view of the first light control device taken along line A-A' of FIG. 5.

FIG. 5 is a plan view of the first light control device 30. FIG. 6 is a cross-sectional view of the first light control device 30 taken along line A-A' of FIG. 5.

A plurality of transparent members 33 each extending in the X direction and arranged side by side in the Y direction are provided on a base member 31. In addition, a plurality of light shielding members 34 each extending in the X direction and arranged side by side in the Y direction are provided on a base member 31. The transparent members 33 and the light shielding members 34 are alternately arranged such that adjacent ones contact with each other. A base member 32 is provided on the transparent members 33 and the light shielding members 34.

The light shielding members 34 extend in the Z direction in a YZ cross section. The transparent members 33 extend in the Z direction in the YZ cross section. The transparent members 33 transmit light. The light shielding members 34 shield light. Widths of the transparent members 33 and the light shielding members 34 in the Y direction can be properly designed.

Transparent resin is used for the base members 31 and 32 and the transparent members 33. For example, acrylic resin is used. For example, resin mixed with black dye is used for the light shielding members 34.

The first light control device 30 configured as described above can transmit display light such that the light intensity in the normal direction reaches its peak in the YZ cross section. For example, the first light control device 30 is configured to shield light components other than a range of 0°±30° supposing that the normal direction is 0°.

<1-3> Structure of Second Light Control Device 40

Figure 7:
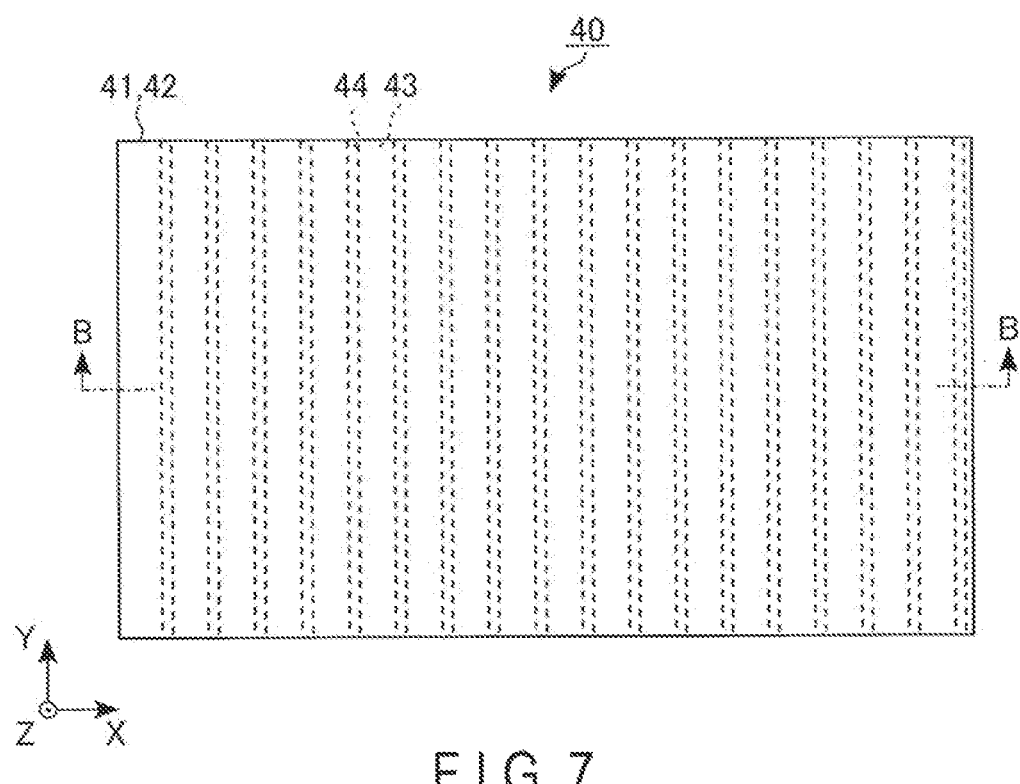
FIG. 7 is a plan view of a second light control device.
Figure 8:
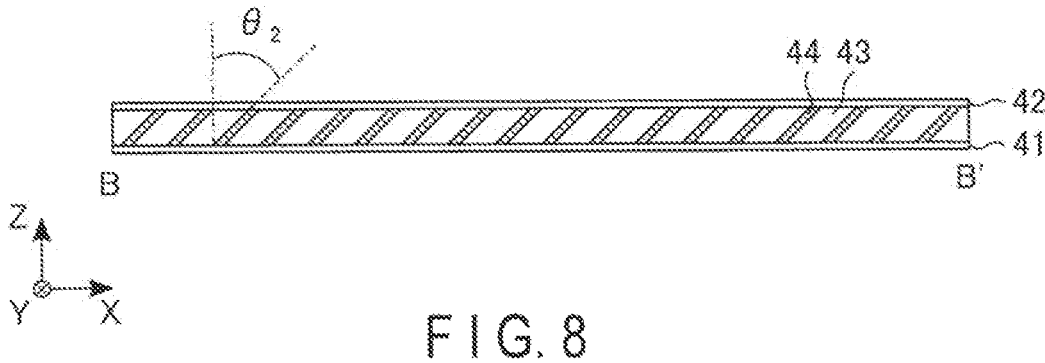
FIG. 8 is a cross-sectional view of the second light control device taken along line B-B' of FIG. 7.

FIG. 7 is a plan view of the second light control device 40. FIG. 8 is a cross-sectional view of the second light control device 40 taken along line B-B' of FIG. 7.

A plurality of transparent members 43 each extending in the Y direction and arranged side by side in the X direction are provided on a base member 41. In addition, a plurality of light shielding members 44 each extending in the Y direction and arranged side by side in the X direction are provided on a base member 41. The transparent members 43 and the light shielding members 44 are alternately arranged such that adjacent ones contact with each other. A base member 42 is provided on the transparent members 43 and the light shielding members 44.

The transparent members 43 extend in an oblique direction having an angle $\theta_2$ with respect to the Z direction in an XZ cross section. Each of the transparent members 43 is a parallelogram having side surfaces inclined by the angle $\theta_2$ in the XZ cross section. The transparent members 43 transmit light.

The light shielding member 44 extend in an oblique direction having an angle $\theta_2$ with respect to the Z direction in an XZ cross section. The light shielding member 44 is a parallelogram having side surfaces inclined by the angle $\theta_2$ in the XZ cross section. The light shielding members 44 shield light.

Adjacent two light shielding members 44 are arranged such that their end portions slightly overlap in the Z direction.

Transparent resin is used for the base members 41 and 42 and the transparent members 43. For example, acrylic resin is used. For example, resin mixed with black dye is used for the light shielding members 44.

The second light control device 40 configured as described above can transmit display light such that the light intensity in the oblique direction having the angle $\theta_2$ with respect to the normal direction reaches its peak in the XZ cross section. For example, the second light control device 40 is configured to shield light components other than a range of 45°±15° with respect to the normal direction.

In the relation between the first light control device 30 and the second light control device 40, the extending direction of the light shielding members 34 of the first light control device 30 is orthogonal to the extending direction of the light shielding members 44 of the second light control device 40.

<1-4> Structure of Mirror Device 50

FIG. 9 is a side view and a bottom view of the mirror device 50. FIG. 9 (*a*) is a side view of the mirror device 50 as viewed in the Y direction, and FIG. 9 (*b*) is a bottom view of the mirror device 50.

The mirror device 50 includes a substrate 51 and a plurality of optical elements 52. FIG. 9 (*a*) illustrates a perspective view of one optical element 52 in an extracted manner. The substrate 51 and the optical elements 52 are formed of a transparent material, such as acrylic resin.

The optical elements 52 are provided on a bottom surface of the substrate 51. Each of the optical elements 52 is formed of a rectangular parallelepiped or a cube. A plan shape of each of the optical elements 52 is, for example, a square.

Each of the optical elements 52 includes two reflection surfaces 52A and 52B. The reflection surfaces 52A and 52B correspond to two side surfaces of the rectangular parallelepiped and contact with each other. The reflection surfaces 52A and 52B form a dihedral corner reflector.

Each of the optical elements 52 is disposed such that one side thereof is inclined by an angle $\theta_3$ with respect to the X direction. The angle $\theta_3$ is, for example, 45°. The angle $\theta_3$ is not limited to 45°, but can be set within a range of 30° to 60°. The optical elements 52 are arranged in a zigzag manner. Specifically, the optical elements 52 are arranged such that each line extends in a direction of 45° with respect to the X direction and a plurality of lines are arranged in a direction of 45° with respect to the Y direction. The optical elements 52 are arranged at intervals therebetween.

The light transmitted through the second optical control device 40 is made incident on each optical element 52 from the bottom surface of the optical element 52, reflected twice by the reflection surfaces 52A and 52B, and thereafter emitted from a top surface of the optical element 52.

<1-5> Structure of Optical Path Deflection Device 60

Figure 10:
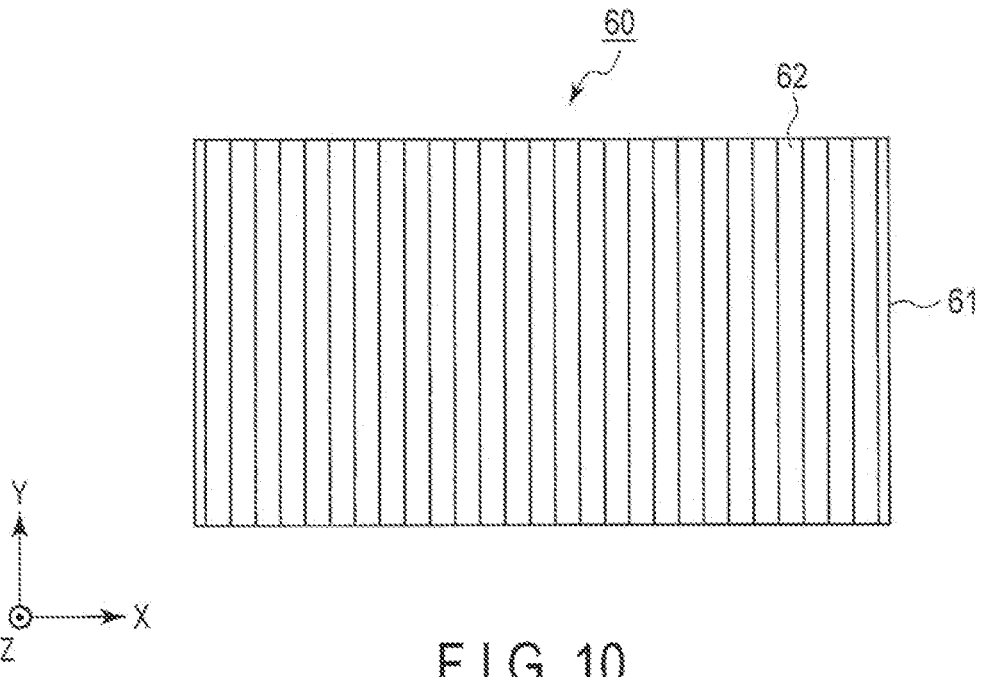
FIG. 10 is a plan view of an optical path deflection device.
Figure 11:
FIG. 11 is a side view of the optical path deflection device as viewed in a Y direction.
Figure 11:
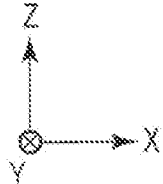

FIG. 10 is a plan view of the optical path deflection device 60. FIG. 11 is a side view of the optical path deflection device 60 as viewed in the Y direction.

The optical path deflection device 60 includes a base member 61 and a plurality of triangular prisms 62 provided on the base member 61. The base member 61 and the triangular prisms 62 may be formed as one unitary piece. The base member 61 and the triangular prisms 62 are formed of a transparent material, such as acrylic resin.

The triangular prisms 62 each extend in the Y direction and are arranged side by side in the X direction. Each of the triangular prisms 62 is formed of a triangular pole extending in the Y direction. Each of the triangular prisms 62 includes a refraction surface 62A. The refraction surface 62A is inclined by an angle $\theta_4$ with respect to the normal direction.

The optical path deflection device 60 configured as described above refracts display light made incident thereon from its bottom surface in the normal direction. The angle $\theta_4$ of the refraction surface 62A is properly set according to the angle of the light made incident on the optical path deflection device 60 and a refractive index of the optical path deflection device 60.

<1-6> Structure of Sensing Device 4

Figure 12:
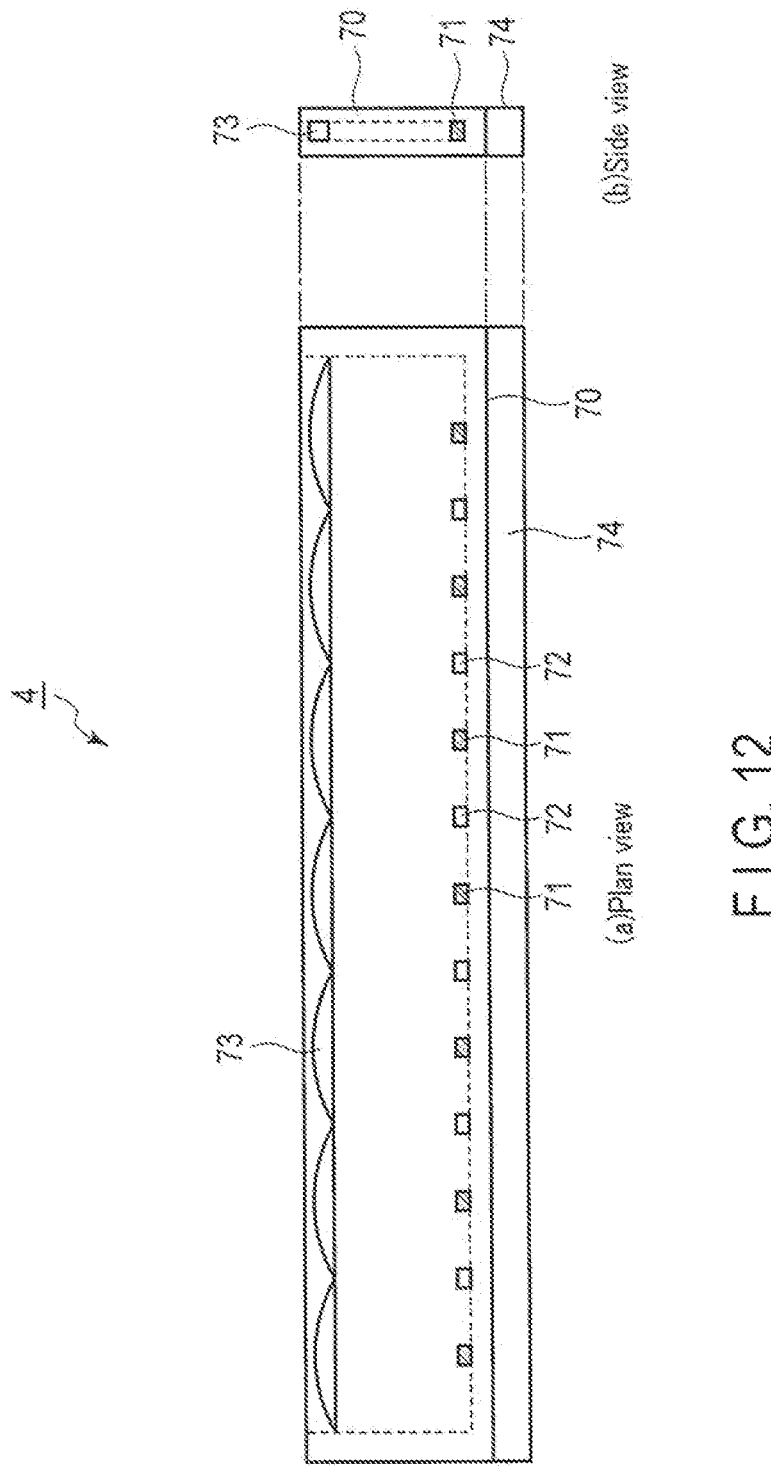
FIG. 12 is a diagram illustrating a structure of a sensing device.

FIG. 12 is a diagram illustrating a structure of the sensing device 4. FIG. 12 (a) is a plane view, and FIG. 12 (b) is a side view thereof. As illustrated in FIG. 1, the sensing device 4 is disposed obliquely with respect to the horizontal direction (XY plane), and disposed such that its part emitting laser light faces slightly diagonally upward with respect to the horizontal direction (XY plane). The plan view of FIG. 12 (a) is a diagram of a top surface of the sensing device 4 of FIG. 1 as viewed from above. In the explanation of FIG. 12, a light-emitting side of the sensing device 4 is referred to as "top portion". The top portion of the sensing device 4 is disposed to face slightly diagonally upward with respect to the horizontal direction.

The sensing device 4 includes a case 70, a plurality of light-emitting elements 71, a plurality of light-receiving elements 72, a plurality of lenses 73, and an angle adjusting mechanism 74.

The case 70 has a box shape with a top portion opened. The case 70 houses the light-emitting elements 71, the light-receiving elements 72, and the lenses 73. In FIG. 12, the light-emitting elements 71, the light-receiving elements 72, and the lenses 73 are illustrated with solid lines to facilitate understanding of the drawing. In FIG. 12, the light-emitting elements 71 are hatched.

The light-emitting elements 71 and the light-receiving elements 72 are provided on a bottom portion of the case 70. The light-emitting elements 71 and the light-receiving elements 72 are alternately arranged.

Each of the light-emitting elements 71 emits laser light. The laser light is, for example, infrared light that does not stimulate the user's visual sense and is not influenced by visible light. Each of the light-emitting elements 71 is formed of, for example, a laser diode.

Each of the light-receiving elements 72 detects laser light (infrared light) reflected by the object. Each of the light-receiving elements 72 is formed of, for example, a photodiode.

The lenses 73 are arranged above the light-emitting elements 71 and the light-receiving elements 72 and fixed in the vicinity of the opening of the case 70. The lenses 73 are arranged side by side in one direction. Each of the lenses 73 is formed of a plano-convex lens. The lenses 73 have a function of condensing laser light emitted from the light-emitting elements 71 in a front direction. The lenses 73 also have a function of condensing laser light reflected by the object.

The angle adjusting mechanism 74 is attached to the bottom portion of the case 70. The angle adjusting mechanism 74 adjusts the direction of the sensing device 4, that is, the angle of the sensing device 4. Specifically, the angle adjusting mechanism 74 adjusts the angle of the case 70. The angle adjusting mechanism 74 adjusts the angle of the sensing device 4 in accordance with information input with an input unit 83.

<2> Block Configuration of Aerial Display Apparatus 1

FIG. 13 is a block diagram of the aerial display apparatus 1. The aerial display apparatus 1 includes the display module 3, the sensing device 4, a control unit 80, a storage unit 81, an input-output interface (input-output IF) 82, and the input unit 83. The control unit 80, the storage unit 81, and the input-output IF 82 are connected via a bus.

The input-output IF 82 is connected to the display module 3, the sensing device 4, and the input unit 83. The input-output IF 82 executes interface processing for each of the display module 3, the sensing device 4, and the input unit 83 according to the predetermined standard.

The display module 3 includes the lighting device 10 and the display device 20. The structure of the display module 3 is as illustrated in FIG. 2.

The sensing device 4 includes the light-emitting elements (light-emitting element group) 71, the light-receiving elements (light-receiving element group) 72, the angle adjusting mechanism 74, and a sensor controller 75. The sensor controller 75 controls operations of the light-emitting elements 71 and the light-receiving elements 72 on the basis of the control of the control unit 80.

The control unit 80 generally controls the aerial display apparatus 1. The control unit 80 includes a display processing unit 80A, a position calculation unit 80B, and an information processing unit 80C.

The display processing unit 80A controls operations of the display module 3. The display processing unit 80A transmits an image signal to the display module 3 to cause the display module 3 to display an image.

The position calculation unit 80B controls operations of the sensing device 4. The position calculation unit 80B causes the sensing device 4 to form a detection region described later. The position calculation unit 80B calculates a position at which the detection region is touched by the user. The position calculation unit 80B determines whether the touched position falls within a specific region included in the display image.

The information processing unit 80C generates an image to be displayed with the aerial display apparatus 1. The information processing unit 80C can use image data stored in the storage unit 81. The information processing unit 80C may acquire image data from outside using a communication function.

The storage unit 81 stores various types of data required for operations of the aerial display apparatus 1. The storage unit 81 also stores data of the image displayed with the aerial display apparatus 1.

The input unit 83 receives information input by the user.

<3> Operations

The following is an explanation of operations of the aerial display apparatus 1 configured as described above.

<3-1> Image Display Operation of Aerial Display Apparatus 1

First, an image display operation of the aerial display apparatus 1 will be explained hereinafter. A bold arrow illustrated in FIG. 3 represents an optical path of the light.

As illustrated in FIG. 3, the lighting device 10 emits illumination light, and emits the illumination light toward the display device 20. The lighting device 10 emits the illumination light such that the light intensity in the oblique direction of the angle $\theta_1$ with respect to the normal direction has a peak. In the present embodiment, the angle $\theta_1$ is approximately 45°.

Figure 14:
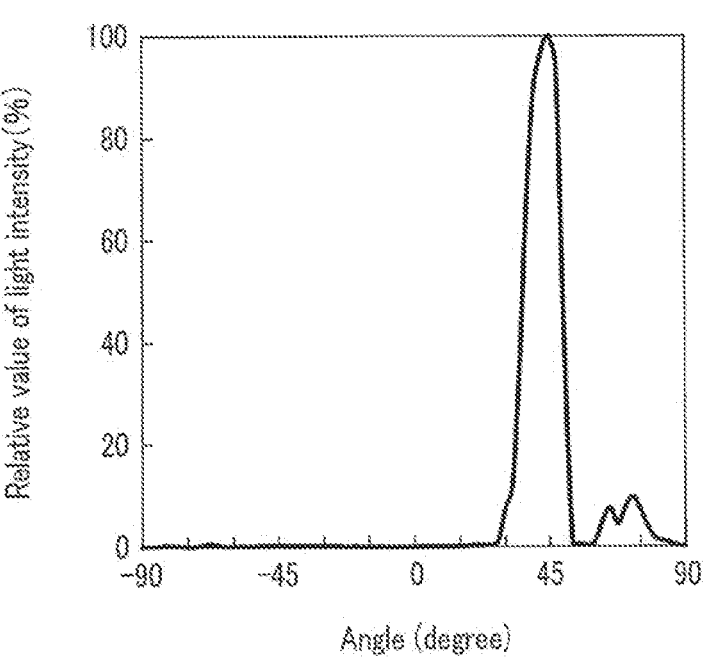
FIG. 14 is a graph illustrating relation between intensity and an angle in illumination light emitted from the lighting device.

FIG. 14 is a graph illustrating relation between the intensity and the angle in the illumination light (emitted light) emitted from the lighting device 10. The vertical axis of FIG. 14 indicates the relative value (%) of the light intensity in the illumination light emitted from the lighting device 10, and the horizontal axis of FIG. 14 indicates the angle (degree) in the illumination light emitted from the lighting device 10 with respect to the normal direction.

As is recognized from FIG. 14, the illumination light emitted from the lighting device 10 has a peak of light intensity at 45° $(=\theta_1)$. In addition, most of the light emitted from the lighting device 10 falls within the range of 30° to 60°.

The display device 20 transmits illumination light from the lighting device 10 and displays an image and/or a moving image. The display device 20 emits display light at the angle $\theta_1$.

The first light control device 30 receives the display light emitted from the display device 20. The first light control device 30 shields light components other than the desired angle range with respect to the normal direction. In addition, the first light control device 30 controls transmission of light in the Y direction. Supposing that the normal direction is 0°, for example, the first light control device 30 shields light other than the range of 0°±30°.

Figure 15:
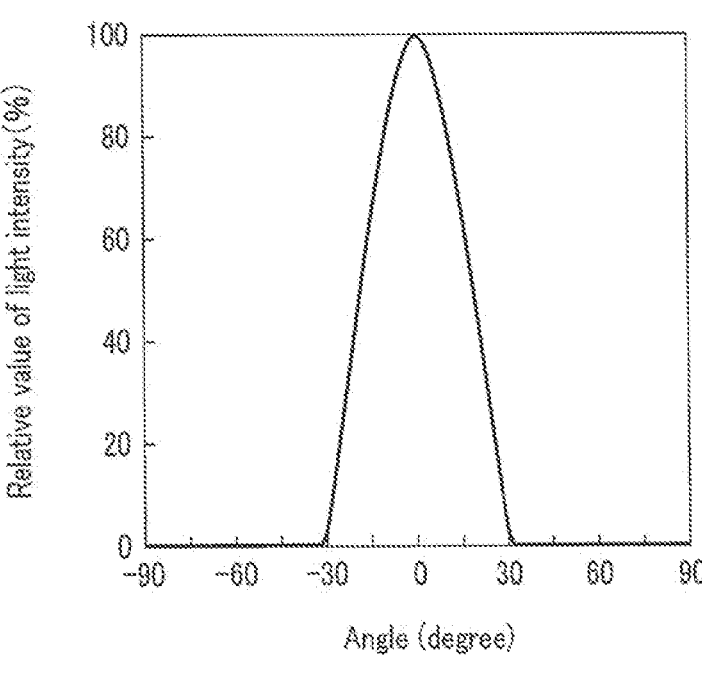
FIG. 15 is a graph illustrating relation between intensity and an angle in display light emitted from the first light control device.

FIG. 15 is a graph illustrating relation between the intensity and the angle in display light (emitted light) emitted from the first light control device 30. The vertical axis of FIG. 15 indicates the relative value (%) of the light intensity in the display light emitted from the first light control device 30, and the horizontal axis of FIG. 15 indicates the angle (degree) in the display light emitted from the first light control device 30 with respect to the normal direction.

As is recognized from FIG. 15, the display light emitted from the first light control device 30 has a peak of light intensity at 0°. In addition, most of the light emitted from the first light control device 30 falls within the range of −30° to 30° (0°±30°). In addition, unnecessary light in the display light emitted from the display device 20 is shielded with the first light control device 30. Providing the first light control device 30 enables reduction of ghosts.

The second light control device 40 receives display light emitted from the first light control device 30. The second light control device 40 shields light components other than the predetermined angle range with the angle $\theta_2$ serving as the center with respect to the normal direction. The second light control device 40 also controls transmission of light in the X direction. In the present embodiment, the angle $\theta_2$ is approximately 45°. Specifically, the emission angle of light emitted from the second light control device 40 is determined in consideration of the refraction index of the transparent material (including the transparent members 43, the base members 41 and 42) of the second light control device 40.

FIG. 16 is a graph illustrating relation between the intensity and the angle in display light (emitted light) emitted from the second light control device 40. The vertical axis of FIG. 16 indicates the relative value (%) of the light intensity in the display light emitted from the second light control device 40, and the horizontal axis of FIG. 16 indicates the angle (degree) in the display light emitted from the second light control device 40 with respect to the normal direction.

As is recognized from FIG. 16, the display light emitted from the second light control device 40 has a peak of light intensity at 45° $(=\theta_2)$. In addition, most of the light emitted from the second light control device 40 falls within the range of 15° to 75° (45°±30°). In addition, unnecessary light in the display light emitted from the first light control device 30 is shielded with the second light control device 40. Providing the second light control device 40 enables reduction of unnecessary light.

The display light emitted from the second light control device 40 is made incident on the mirror device 50 obliquely, that is, made incident on the mirror device 50 by approximately 45° with respect to the normal direction. The mirror device 50 reflects the light made incident thereon from the second light control device 40 side toward the side opposite to the second light control device 40. In addition, the mirror device 50 reflects the incident light in a plane-symmetrical direction with respect to the mirror device 50. In other words, the mirror device 50 reflects the incident light at made incident thereon by +45° with respect to the normal direction in a direction of −45°.

The display light emitted from the mirror device 50 is made incident on the optical path deflection device 60 obliquely, that is, made incident on the optical path deflection device 60 by approximately 45° with respect to the normal direction. The optical path deflection device 60 refracts the display light made incident thereon obliquely from its bottom surface in the normal direction. Specifically, the optical path deflection device 60 emits the display light toward the front of the display module 3.

The display light emitted from the optical path deflection device 60 forms an aerial image 5. The aerial image 5 is visually recognized by the viewer 6 positioned in front of the display module 3.

<3-2> Detection Operation of Sensing Device 4

The following is an explanation of a detection operation of the sensing device 4.

FIG. 17 is a diagram illustrating a detection region of the sensing device 4. FIG. 17 (*a*) is a plan view, and FIG. 17 (*b*) is a side view.

Each of the light-emitting elements 71 included in the sensing device 4 emits a laser light beam 76. The laser light beams 76 emitted from the respective light-emitting elements 71 are transmitted through the lenses 73 and emitted in the front direction from the sensing device 4. The front of the sensing device 4 means the front of a supposed light-emission surface of the sensing device 4.

The light-emitting elements 71 are arranged in one direction. A plurality of laser light beams 76 emitted from the respective light-emitting elements 71 advance straight mutually in parallel. Accordingly, a detection region 77 is obtained in a plane (two dimensions) illustrated in FIG. 17 (*a*).

Figure 18:
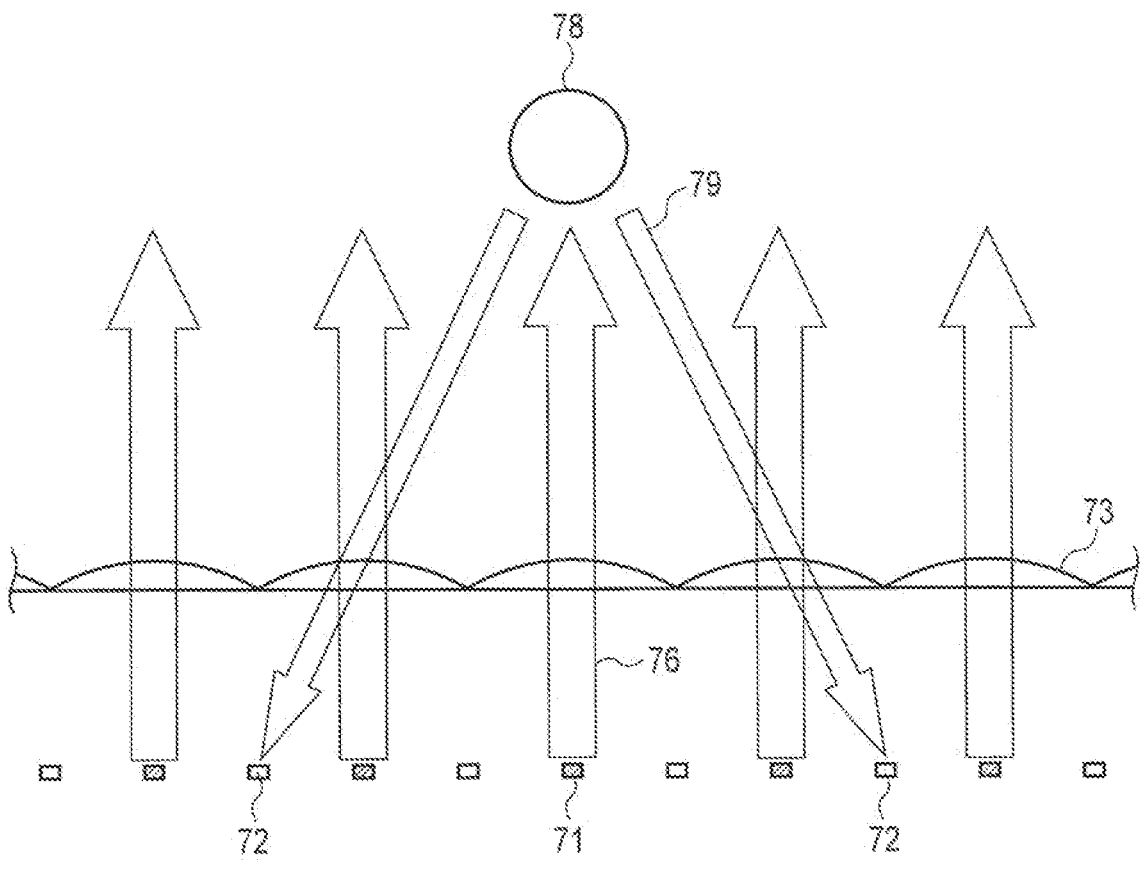
FIG. 18 is a diagram illustrating an operation of calculating a position of a detection object with the sensing device.

FIG. 18 is a diagram illustrating an operation of calculating a position of a detection object 78 with the sensing device 4.

When the detection object 78 enters the detection region 77 described above, the laser light beam 76 emitted from the light-emitting element 71 is reflected by the detection object 78. Reflected light beams 79 reflected by the detection object 78 reach the light-receiving elements 72 and detected with the light-receiving elements 72.

When no detection object exists in the detection region 77, no reflected light beams are generated from the laser light beam emitted from the light-emitting element 71. Accordingly, no reflected light beams reach the light-receiving elements 72, and no reflected light beams are detected by the light-receiving elements 72.

The light-emitting elements 71 emit laser light so as to successively turn on temporally. The light-receiving elements 72 detect reflected light from the detection object 78 through the lenses 73. The position calculation unit 80B calculates and specifies the position of the detection object 78 using the intensity of light detected with the light-receiving elements 72, for example, using "principle of triangulation". Specifically, the position calculation unit 80B calculates the position of the detection object 78 using a distance between the emission point of the laser light and the light-receiving point of the reflected light, the angle of the emission point, and the angle of the light-receiving point.

Figure 19:
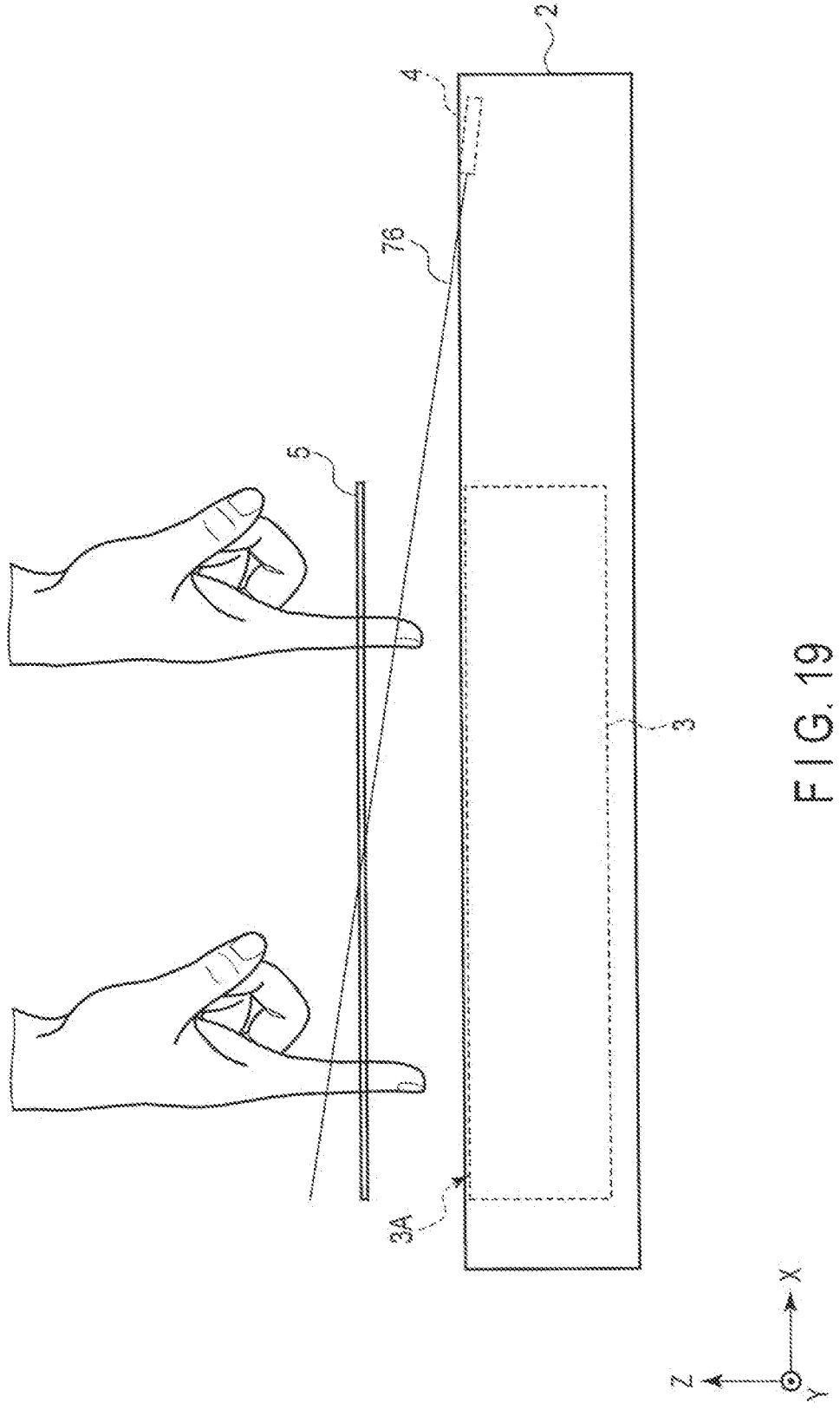
FIG. 19 is a diagram illustrating an operation of the sensing device.

FIG. 19 is a diagram illustrating an operation of the sensing device 4. Suppose that the detection object 78 is a viewer's finger.

The sensing device 4 emits laser light beams 76 in an oblique direction with respect to a light emission surface 3A of the display module 3. The light emission surface 3A of the display module 3 is a surface parallel with the XY plane. The sensing device 4 emits the laser light beams 76 such that the detection region 77 crosses the aerial image 5 obliquely. Specifically, the detection region 77 of the sensing device 4 crosses the aerial image 5 obliquely.

When the viewer touches the aerial image 5 by viewer's finger, the finger does not stop at the plane of the aerial image 5, but penetrates the aerial image 5 to a certain distance. For this reason, the viewer's finger can be detected without setting the detection region 77 of the sensing device 4 to overlap the aerial image 5 in parallel.

When the viewer's finger enters the detection region 77, laser light is reflected by the finger, and the reflected light reaches the sensing device 4. In this manner, the sensing device 4 can calculate the position of the viewer's finger.

FIG. 20 is a schematic diagram illustrating the setting position of the sensing device 4. Suppose that the reference plane is the light emission surface of the display module 3.

In FIG. 20, the light emission surface of the display module 3 corresponds to the top surface of the optical path deflection device 60.

Variables are as follows.

Di: Distance between light emission surface of display module 3 and aerial image 5

Ds: Distance between light emission surface of display module 3 and light emission surface of sensing device 4

Ld: Length of aerial image 5 in X direction

Ls: Horizontal distance from end of aerial image 5 to light emission surface of sensing device 4

$\Theta_5$: Setting angle of sensing device 4 from horizontal plane (=angle of detection region 77 from horizontal plane)

From the variables, the setting angle $\theta_5$ of the sensing device 4 is calculated from the following expression.

$$\tan \theta_5 = (Di+Ds)/(Ld+Ls)$$

<3-3> Entire Operation of Aerial Display Apparatus 1

The following is an explanation of the entire operation of the aerial display apparatus 1. FIG. 21 is a flowchart illustrating the entire operation of the aerial display apparatus 1.

The display processing unit 80A transmits an image signal to the display module 3 to cause the display module 3 to display an image. The image to be displayed is generated with the information processing unit 80C. The display module 3 displays an image as an aerial image on the basis of the control of the display processing unit 80A (Step S100).

Thereafter, the position calculation unit 80B causes the sensing device 4 to form the detection region 77. The sensing device 4 emits laser light for the detection region 77 on the basis of the control of the position calculation unit 80B (Step S101).

Thereafter, the sensing device 4 detects a touch operation performed by the user (Step S102). If a touch operation is detected with the sensing device 4 (Yes at Step S102), the position calculation unit 80B calculates the position of the touch operation (Step S103).

Thereafter, the position calculation unit 80B determines whether the position calculated at Step S103 falls within a specific region (Step S104). The specific region is a region being a part of the image displayed at Step S100, for example, an image of a push button or an icon.

If the position falls within the specific region (Yes at Step S104), the display processing unit 80A transmits an image signal linked to the specific region to the display module 3, and causes the display module 3 to display a linked image. The linked image is generated with the information processing apparatus 80C. The display module 3 displays the linked image as an aerial image on the basis of the control of the display processing unit 80A (Step S105). If the position does not fall within the specific region (No at Step S104), the control unit 80 returns to Step S102.

Thereafter, the sensing device 4 detects an end operation performed by the user (Step S106). The end operation is, for example, touching an image of a button representing "end" by the user. If no end operation is detected (No at Step S106), the control unit 80 returns to Step S102. If an end operation is detected (Yes at Step S106), the control unit 80 ends the processing.

<4> Effects of Embodiment

As described in detail above, according to the present embodiment, the aerial display apparatus 1 includes: the display module 3 including the light emission surface 3A emitting display light to display an aerial image, and displaying the aerial image on a first plane located above the light emission surface 3A and parallel with the light emission surface 3A; a sensing device 4 emitting the laser light beams 76 to form the detection region 77 on a second plane obliquely crossing the first plane, and detecting the object 78 entering the detection region 77; and the housing 2 housing the display module 3 and the sensing device 4.

With this structure, according to the present embodiment, an operation of touching an aerial image can be detected in a non-contact manner. In addition, sensing can be executed even when the sensing device 4 is disposed in a position distant from the aerial image.

In addition, the display module 3 can form an aerial image in the front direction. The devices forming the display module 3 are arranged mutually in parallel. This structure enables reduction in size of the display module 3. For the same reason, the size of the aerial display apparatus 1 can be reduced. This structure also enables downsizing of the housing 2.

In addition, this structure secures the display quality of the aerial image while downsizing the aerial display apparatus 1.

The embodiment described above illustrates a liquid crystal display device as an example of the display device, but the display device may be a display device other than a liquid crystal display device, such as an organic electroluminescence (EL) display device of a spontaneous light emitting type. In the case of using an organic EL display device, the lighting device 10 is omitted.

The embodiment described above illustrates the aerial display apparatus 1 in which the display device 20 and the mirror device 50 are arranged in parallel, but the structure is not limited thereto. The sensing device 4 is applicable to an aerial display apparatus in which the display device 20 is disposed obliquely with respect to the mirror device 50. In this case, the optical path deflection device 60 can be omitted.

The present invention is not limited to the above-described embodiment, but can be modified in various manners in practice, without departing from the gist of the invention. Moreover, the embodiment can be suitably combined; in that case, combined advantages are obtained. Furthermore, the above-described embodiment includes various inventions, and various inventions can be extracted from a combination selected from structural elements disclosed herein. For example, if the problem can be solved and the effects can be attained even after some of the structural elements are deleted from all the structural elements disclosed in the embodiment, the structure made up of the resultant structural elements may be extracted as an invention.

The invention claimed is:

1. An aerial display apparatus comprising:
a display module including a light emission surface emitting display light to display an aerial image, and displaying the aerial image on a first plane located above the light emission surface and parallel with the light emission surface;
a sensing device emitting laser light to form a detection region on a second plane obliquely crossing the first plane, and detecting an object entering the detection region; and
a housing housing the display module and the sensing device, wherein the sensing device includes:

a plurality of light-emitting elements arranged in a first direction and emitting the laser light; and
a plurality of light-receiving elements arranged in the first direction and detecting reflected light reflected by the object.

2. The aerial display apparatus according to claim 1, wherein
the display module includes:
a display device displaying an image; and
a mirror device disposed to receive light from the display device, reflecting the light from the display device to a side opposite to the display device, and configured to form an aerial image in an aerial space.

3. The aerial display apparatus according to claim 2, wherein the display module includes:
an optical path deflection device refracting the light reflected with the mirror device in a direction perpendicular to the light emission surface, and
the display device, the mirror device, and the optical path deflection device are arranged mutually in parallel.

4. The aerial display apparatus according to claim 3, wherein the optical path deflection device includes a plurality of prisms.

5. The aerial display apparatus according to claim 2, wherein
the mirror device includes a plurality of optical elements, and
each of the optical elements is formed of a rectangular parallelepiped or a cube, and includes a first and a second reflection surfaces contacting with each other and reflecting light.

6. The aerial display apparatus according to claim 2, wherein
the display module includes a lighting device emitting light toward the display device, and
the display device is a liquid crystal display device.

7. The aerial display apparatus according to claim 2, wherein
the display module includes a first light control device disposed between the display device and the mirror device,
the first light control device includes a plurality of first transparent members and a plurality of first light shielding members,
the first transparent members and the first light shielding members are alternately arranged such that adjacent ones contact with each other, and
each of the first transparent members and the first light shielding members extends in the direction perpendicular to the light emission surface.

8. The aerial display apparatus according to claim 7, wherein
the display module includes a second light control device disposed between the display device and the mirror device,
the second light control device includes a plurality of second transparent members and a plurality of second light shielding members,
the second transparent members and the second light shielding members are alternately arranged such that adjacent ones contact with each other, and
each of the second transparent members and the second light shielding members extends in an oblique direction with respect to the direction perpendicular to the light emission surface.

9. The aerial display apparatus according to claim 1, wherein the light-emitting elements and the light-receiving elements are alternately arranged.

10. The aerial display apparatus according to claim 1, wherein the sensing device includes an angle adjusting mechanism adjusting an angle at which the first plane crosses the detection region by adjusting angles with which the light-emitting elements face.

11. The aerial display apparatus according to claim 1, wherein the sensing device includes a plurality of lenses provided above the light-emitting elements and the light-receiving elements.

12. The aerial display apparatus according to claim 11, wherein the sensing device includes a case housing the light-emitting elements, the light-receiving elements, and the lenses.

* * * * *